G. D. YATES.
SHOCK ABSORBER.
APPLICATION FILED JULY 13, 1912.
1,047,477.
Patented Dec. 17, 1912.
2 SHEETS—SHEET 1.
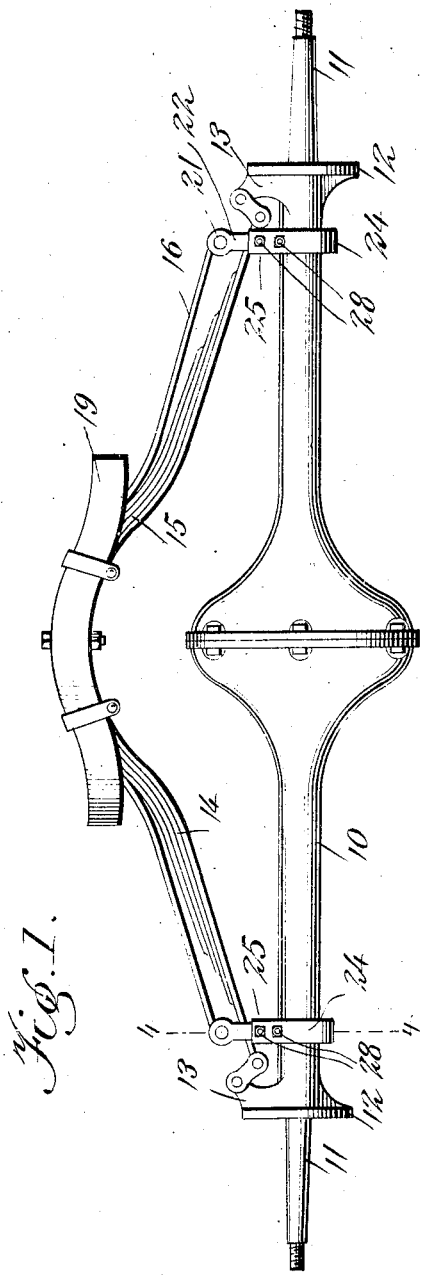
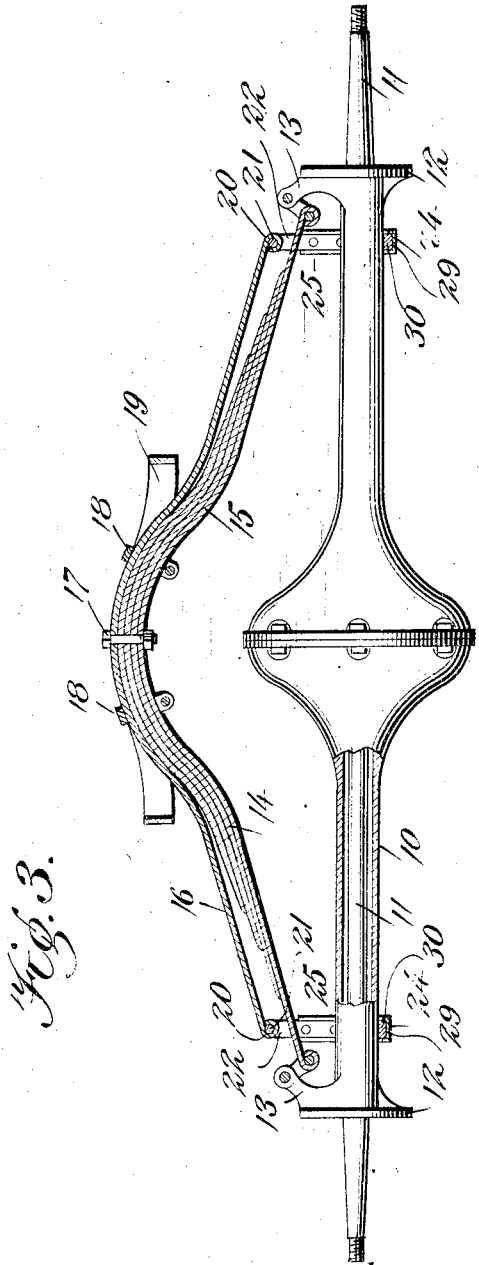
Witnesses
Geo. Ackman Jr.
C. C. Hines
Inventor
Gideon D. Yates
By
Attorney

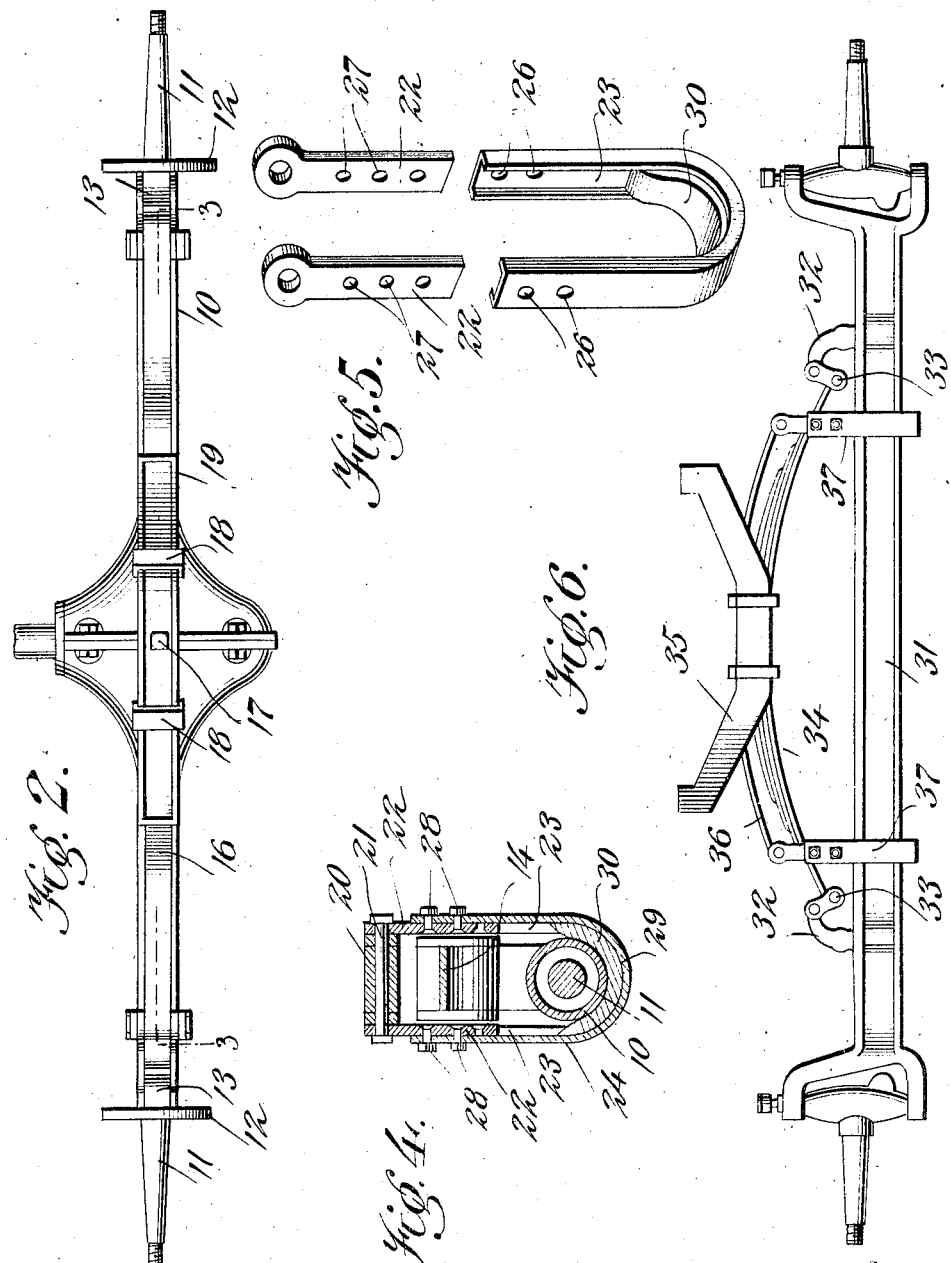

UNITED STATES PATENT OFFICE.

GIDEON D. YATES, OF LISLE, NEW YORK.

SHOCK-ABSORBER.

1,047,477. Specification of Letters Patent. Patented Dec. 17, 1912.

Application filed July 13, 1912. Serial No. 709,282.

*To all whom it may concern:*

Be it known that I, GIDEON D. YATES, a citizen of the United States, residing at Lisle, in the county of Broome and State of New York, have invented certain new and useful Improvements in Shock-Absorbers, of which the following is a specification.

This invention relates to cushioning devices and has for an object to provide a shock absorber, for use in connection with vehicles, for cushioning the body of the vehicle.

My invention is particularly adaptable to self propelled vehicles such as automobiles and comprehends, among other features, a device for increasing the resistance of the carrying spring of the automobile, when the same is flexed from normal position, due to an increased weight or pressure being applied to the spring, and particularly when the spring is subjected to a sudden jar or shock.

In the further disclosure of the invention reference is to be had to the accompanying drawings, constituting a part of this specification, in which similar characters of reference denote corresponding parts in all the views, and in which, Figure 1 is a rear elevation of the rear axle of a vehicle showing my device applied thereto. Fig. 2 is a plan view. Fig. 3 is a vertical longitudinal sectional view taken on the line 3—3 in Fig. 2. Fig. 4 is a vertical transverse sectional view taken on the line 4—4 in Fig. 1. Fig. 5 is a perspective view of one of the shackles, showing the adjustable arms in detached position, and Fig. 6 is a rear elevation of the front axle of a vehicle having my device applied thereto.

Referring to the views and more particularly to Figs. 1–5 inclusive, I disclose the usual rear axle casing 10 carrying therein a rear vehicle axle 11, the ends of the said casing terminating in flanges 12 having formed therewith or secured thereto brackets 13, extending inwardly toward the casing 10 and having pivotal connection with a carrying spring 14 extending over and above the casing 10 to support the body of a vehicle. The carrying spring 14 can be made in any desired shape or size convenient to the use thereof and mounted on the carrying spring on a medial curved portion 15 thereof is a spring like member 16, consisting of a preferably flat strip of metal of a spring like nature, secured to the carrying spring 14, at its medial portion, by a vertically arranged bolt 17, extending through the member 16 and the carrying spring 14, straps 18 being arranged to encircle the carrying spring 14, the member 16 and a cross-piece 19 upon which the vehicle body is adapted to seat, the mentioned straps 18 being arranged on both sides of the bolt 17.

The ends of the member 16 are bent to form eyes 20, through which pins 21 are passed, the said pins being also passed transversely through the upper ends of arms 22, mounted to slide in guideways 23, formed in U shaped stirrups 24, the said arms 22 and stirrups 24 constituting shackles 25, with the stirrups 24 mounted to encircle the casing 10. The stirrups 24 are provided with apertures 26 and similarly the arms 22 are provided with apertures 27, pins 28 being provided to pass through registering apertures 26, 27 for the purpose of adjustably securing the arms 22 on the stirrups 24. The stirrups 24 are U shaped in cross section to form the guideways 23, mentioned heretofore, the said guideways forming seats 29 for the reception of pads 30, preferably made of leather or the like, the said pads being of sufficient thickness to project beyond the guideways 23 and engage the axle casing 10.

In the use of my device, the member 16 will be in normal position when the carrying spring 14 is in normal position as shown in Fig. 1. It will now be readily seen that when the carrying spring 14 is flexed out of normal position, due to a load placed upon the spring or to an upward movement imparted to the usual wheels on the axle 11 when one or both the wheels strike an obstruction, the flexible member 16 will also be flexed out of normal position to exert a check upon the carrying spring, thus cushioning the jar or shock imparted thereto. By means of the adjustable connection between the member 16 and the shackles 25, the checking action of the member 16 can be regulated in proportion to the rebound of the carrying spring.

In Fig. 6 I disclose a front axle 31 of any usual type and provided with brackets 32 having pivotal connection with the ends 33 of a carrying spring 34 to which is secured a cross piece 35 in the same manner as the cross piece 19 is secured to the rear carrying spring 14, the brackets 32 in Fig. 6, however, being positioned closer to the center of the axle 31, whereas in Fig. 1 the brackets 13 are arranged adjacent the ends of the rear axle 11. A member 36, similar to the member 16, is secured to the axle 31 with the ends of the member having pivotal connection with shackles 37, similar to the shackles 25, the mentioned shackles 37, however, being arranged closer to the center of the axle 31 than the relation of the shackles 25 to the center of the axle 11.

The operation of the member 36 in Fig. 6 is similar to the operation of the member 16 in Figs. 1 to 4 inclusive, the only difference being in the manner of mounting the front member 36 on the front axle 31 when compared to the mounting of the rear member 16 on the rear axle 14.

The shock absorbing device described can be employed in connection with various types of vehicles, although I preferably use the device on automobiles, particularly those known as Ford automobiles.

Having thus described the invention what is claimed as new, is:—

1. In combination with an axle casing having a carrying spring mounted thereon, a flexible member secured to the carrying spring, shackles encircling the axle casing and consisting of stirrups having arms adjustably mounted thereon and pins on the arms of the said shackles and having pivotal connection with the ends of the said member.

2. In combination with an axle casing having a carrying spring supported thereon, a flexible member secured to the carrying spring and adjustable means mounted on the said casing and having the ends of the said member connected thereto.

3. In combination with an axle casing having a carrying spring supported thereon, a flexible member intermediately supported on the carrying spring and adjustable shackles mounted on the said axle casing and having pivotal connection with the ends of the said flexible member.

4. In a shock absorber including a member supported on a carrying spring mounted on an axle casing, stirrups encircling the said casing, pads on the stirrups and engaging the casing guideways on the said stirrups and arms mounted to slide in the said guideways and adjustable on the said stirrups, the said arms having pivotal connection with the said member.

5. In a shock absorber, the combination with an axle casing, of a carrying spring mounted thereon, a flexible member centrally secured to the intermediate portion of the spring, stirrups encircling the casing, guideways on the stirrups, arms slidable in the said guideways, means for adjusting the arms on the said stirrups, and means pivotally connecting the ends of the said flexible member to the said arms.

In testimony whereof I affix my signature in presence of two witnesses.

GIDEON D. YATES.

Witnesses:
JERRE F. SULLIVAN,
JOHN DENNING.